July 9, 1940. J. G. JACKSON 2,207,622
BAKING PAN AND METHOD OF MAKING THE SAME
Filed April 18, 1938 3 Sheets-Sheet 1

INVENTOR.
Joseph G. Jackson
BY Stanley Hoods
ATTORNEY.

July 9, 1940.                J. G. JACKSON                2,207,622
                BAKING PAN AND METHOD OF MAKING THE SAME
                Filed April 18, 1938          3 Sheets-Sheet 2

INVENTOR.
Joseph G. Jackson
BY Stanley Woods
ATTORNEY.

July 9, 1940.   J. G. JACKSON   2,207,622
BAKING PAN AND METHOD OF MAKING THE SAME
Filed April 18, 1938   3 Sheets-Sheet 3

INVENTOR.
Joseph G. Jackson
BY Stanley Howds
ATTORNEY.

Patented July 9, 1940

2,207,622

UNITED STATES PATENT OFFICE 2,207,622

BAKING PAN AND METHOD OF MAKING THE SAME

Joseph G. Jackson, Oak Park, Ill., assignor to The Edward Katzinger Company, Chicago, Ill., a corporation of Illinois Application April 18, 1938, Serial No. 202,643

9 Claims. (Cl. 53—6)

This invention relates to baking pans and particularly to the corner construction thereof and the assembly of a plurality of such pans into a multiple unit.

This invention has for its object the provision of a corner construction for baking pans whereby the wire or metal frame encircling the pan walls and forming the base or core of the bead at the edges thereof is completely covered at the corners of the pan, thereby reinforcing the corners and eliminating the presence of exposed and raw metal edges.

This invention has as a further object the provision of a multiple pan unit wherein the individual pans are secured one to the other by straps, and the creation of smooth uninterrupted joints between coacting straps of the set, whereby rough and raw edges of metal are eliminated and the liability of hooking is reduced if not entirely eliminated.

Another feature of the present invention is the provision of a strap so constructed and arranged with respect to the pans and the bead at the upper edges thereof to provide extra reinforcement for the walls of the pans.

With the above and other objects in view, as will be apparent, this invention consists in the construction, combination and arrangement of parts, all as hereinafter more fully described, claimed and illustrated in the accompanying drawings wherein:

Reference being had more particularly to the drawings, 10, 11 and 12 designate the respective pans of a pan set, each of uniform rectangular design and construction, bound or secured together in aligned and spaced relation by means of straps 25 which coact with and extend across the aligned ends of the pans aforesaid. While the drawings illustrate a unitary assembly of three baking pans, comprising two end pans 10 and 12 and an intermediate pan 11, it will be apparent that fewer or greater numbers of pans may be included in the assembly if desired.

Figures 7, 8:
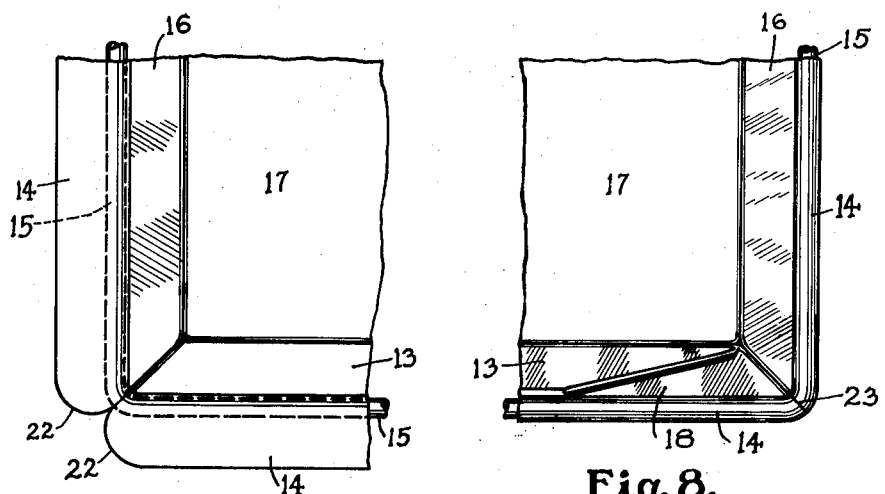
Fig. 7 is an enlarged fragmentary top plan view of the corner shown in Fig. 6, during the initial assembly thereof, including a dotted line showing of the wire frame in position for final assembly.
Fig. 8 is an enlarged fragmentary bottom plan view of the same corner when finally assembled with the wire frame.

Each of the pans 10, 11 and 12 is provided with an outstanding peripheral bead or flange 14, containing a reinforcing wire 15. In forming this type of pan, the side walls 16 and end walls 13 of the sheet or material forming the pan are folded to an angular position with relation to the bottom 17, developing a fullness of material at the corners that is commonly taken care of by creating a V-shaped fold or flap 18 of such surplus, and flattening and bending the same into engagement with the end wall 13, as shown in Fig. 8. Preferably, the material for the pan is so cut that the top of these flaps or folds will lie substantially horizontally and closely adjacent to the reinforcing wire 15. The flanges 14 are bent outwardly, downwardly, and then inwardly over the reenforcing wire 15 so that the edges thereof rest in close proximity to the outer surface of the pan.

Figure 6:
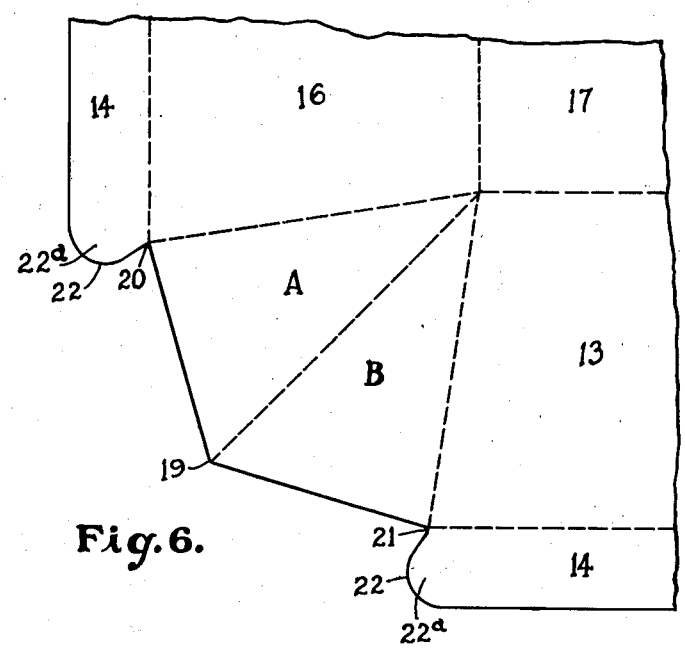
Fig. 6 is an enlarged fragmentary plan view of one corner of the metal blank from which the individual pan is made, illustrating the form of the corner construction prior to assembly of the individual pan.

In order to provide the corner construction of the individual pan as contemplated by this invention, at the points where the flanges 14 join each other, it is necessary to provide an abutting joint between said adjoining ends of the flanges after they have embraced and engaged the wire 15. To accomplish this, the corners of the sheet at what may be said to be the terminals of the flanges 14, are cut on curves, the curve at the end of one flange adapted to coact with the curve at the adjoining end of the next adjacent flange. This forming of the ends of the flanges is accomplished by cutting from each corner of the sheet a section of metal having the irregularly formed base as shown in Fig. 6. This corner edge of the sheet is formed by cutting away or notching the same to produce an angular projection 19, the apex of which constitutes the outer corner of the V-shaped fold or flap 18 while the inner upper corner of the flap 18 occurs at the points 20 and 21. By thus notching the corners of the sheet, straight strips or flanges 14 are left on the ends and sides of the blank, which coact with the reinforcing wire 15 to provide a continuous outstanding peripheral bead on the pan. From the points 20 and 21, respectively, the end edges of the flanges 14 curve outwardly as at 22 to connect with the outer edge of the flange. Thus, the curved end of each flange starts at the associated point 20 or 21 and curves outwardly as at 22 to connect with the outer longitudinal edge of the flange to form a tongue 22ᵃ on the end of each flange 14.

After the sheet has been formed as indicated in Fig. 6 with each corner thereof cut as illustrated to create complemental curved flange ends or tongues 22ᵃ, and the sections A and B have been folded or bent to the positions they occupy relatively to the bottom 17 in the completed pan to create the V-shaped flap 18, as shown in Fig. 8, the flanges 14 are bent outwardly as illustrated in Fig. 7. Thereupon the reinforcing wire frame 15 is placed to rest snugly in the curved juncture zone between the flanges 14 and the outside of the pan walls, with the corners of the frame 15 disposed in alignment with the cut away corners of the sheet and approximately coinciding with the aligned points 20 and 21.

The flanges 14 are then bent downwardly and inwardly to embrace the wire frame 15 and terminate with their longitudinal edges in close proximity to the outer surface of the pan walls. The adjoining curved end edges 22 of the flanges 14 which meet at the points 20 and 21, then abut at each corner of the sheet, flush one against the other, to create a seam 23 as illustrated in Fig. 8 of the drawings, the adjoining curved ends of the flanges 14 accommodating and following the curve or contour of the wire frame 15 to create a substantially straight, smooth seam between the adjoining edges of the flanges 14. At this seam 23, the ends of the flanges 14 do not overlap nor are there any exposed edges. In other words, the edges of the tongues 22ᵃ abut each other to cause the wire 15 to be completely covered at the corner.

The straps 25 which coact with and extend across the aligned ends of the pans 10, 11 and 12 to form a unitary pan assembly are secured to the associated pan end wall 13 by means of rivets 24 which penetrate the strap 25 and the V-shaped flap 18 whereby no parts of the rivets 24 are exposed inside the pans to contact with the contents thereof. Longitudinal beads or corrugations 26 are formed along the top and bottom edges of said straps 25, the bead 26 at the upper edge being arranged to rest against the bead 14 containing the reenforcing wire 15 at the upper edge of the pan. These beads 26 along the upper edges of the straps 25 extend almost flush with the limits of the adjoining beads 14 of the pan end walls 13 and protect the beads 14 from shocks, bumps or jars which might otherwise damage said beads and pan ends. The lower bead 26 may also serve to limit the nesting action of a plurality of pan sets when stacked in nested relation. At each of its ends, the strap 25 is provided with an ear 28 of any suitable shape and construction, which is bent laterally to assume a substantially right angular position to the main body of the strap 25.

Figure 4:
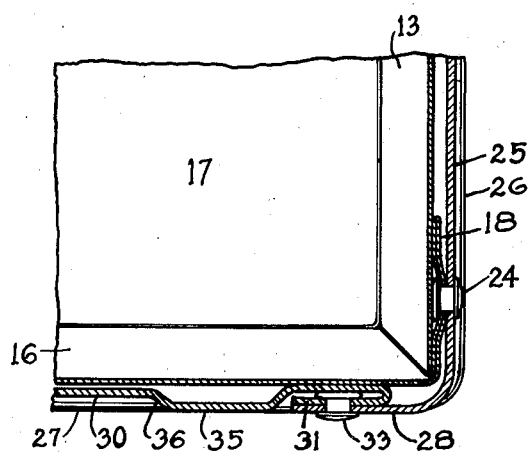
Fig. 4 is a horizontal section taken along line 4—4 of Fig. 3.

A strap 30 coacts with the end wall of the set, which is also the exposed side wall of the endmost pan of the set. This strap 30 is similar in construction to strap 25, having beads or corrugations 27 formed along the top and bottom longitudinal edges thereof. The bead 27 at the upper edge, like the bead 26 at the upper edge of the straps 25, is arranged to rest snugly against the underside of the bead 14 containing the reinforcing wire 15 at the upper edge of the pan wall associated therewith. An ear 31 is formed at the edge of the strap 30 adjoining the end of the strap 25, which ear 31 is bent outwardly and inwardly upon itself and thus be interposed between the strap 30 and the ear 28 of the strap 25. Connection of the strap 30 and the ear 28 of the strap 25 is established by means of a rivet or other suitable fastening means 33 passing through the ear 31 of the strap 30 and the ear 28 of the strap 25, and having the head thereof positioned between the strap 30 and the inner surface of the ear 31 of the strap 30 whereby no parts of the rivet 33 are exposed inside the pan, as disclosed in Fig. 4.

Figure 1:
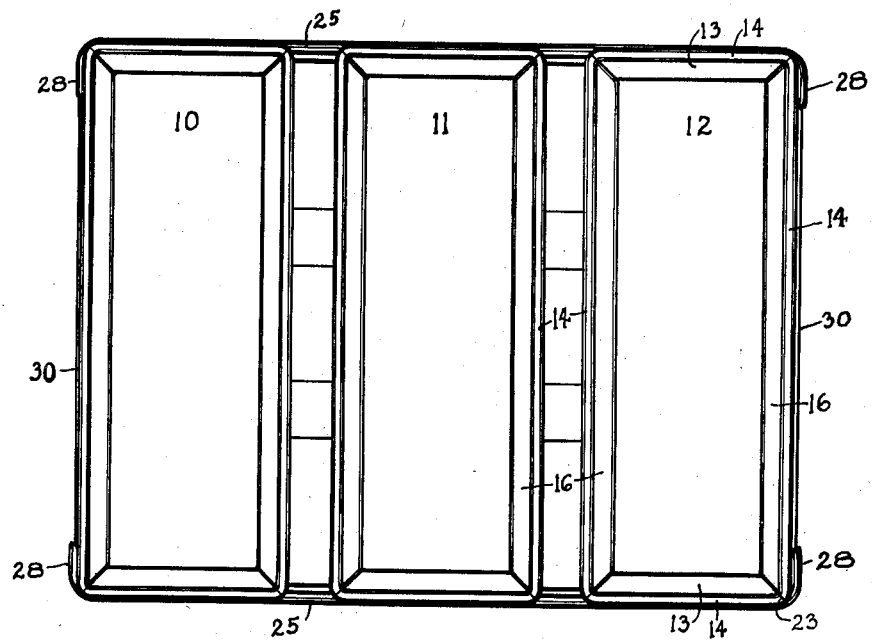
Fig. 1 is a top plan view of a pan set incorporating the features of this invention.
Figure 2:
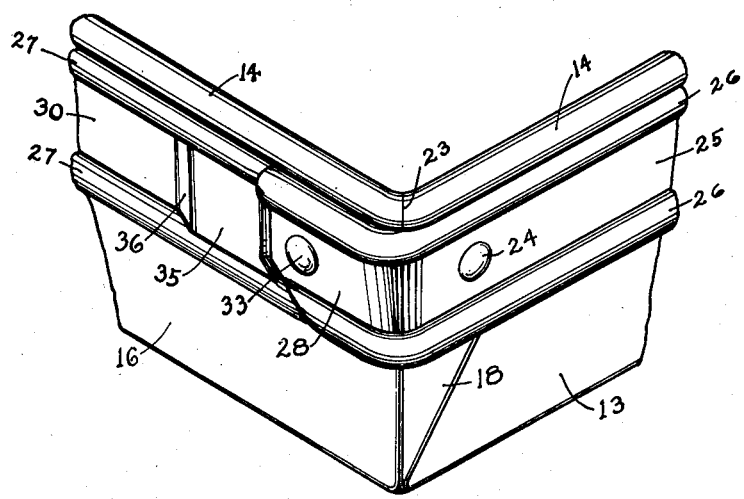
Fig. 2 is an enlarged fragmentary perspective view of the corner of an end pan of the set shown in Fig. 1.
Figure 3:
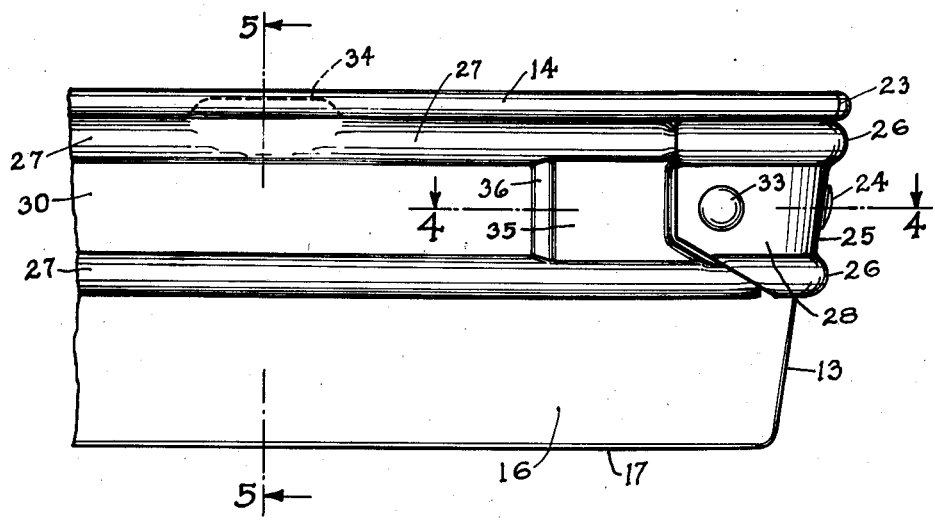
Fig. 3 is an enlarged fragmentary side elevational view of an end pan of the set shown in Fig. 1.
Figure 5:
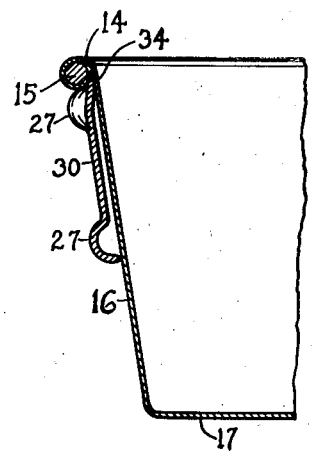
Fig. 5 is a vertical section taken along line 5—5 of Fig. 3.

Connection of the strap 30 to the pan wall thereunder may be secured by means of lugs 34 struck from the upper edge of the strap 30, forming a continuation of the highest limit of the top bead 27, which lugs 34 may be engaged between the wire reinforcing frame 15 and the adjacent surface of the pan at the wire beaded edge 14 thereof, as shown in Fig. 5. Each of these lugs is formed by flattening a portion of the bead 27 to extrude said portion upwardly above the marginal edge of the strap.

That portion of the strap 30 immediately adjacent to the exposed edges of the ear 28, which overlaps the strap 30, is formed or bent outwardly to create a boss 35 following the outer and lower edges of the ear 28, from approximately the upper bead 27 of the strap 30 to the lower bead thereof. This boss is of such height that it project outwardly from the face of the strap 30 a distance greater than the thickness of the ear 31 or of the combined thicknesses of the ears 31 and 28, as desired. The outer surface of this boss is smooth and closely adheres to and follows the contour of the adjoining edge of the ear 28. The remote side of the boss 35 merges with that portion 36 of the strap 30 which slopes upwardly from the body of the strap 30, said sloping portion 36 being produced in the forming of the boss 35.

From the foregoing, it is apparent that the joint between the strap 30 and the strap 25 is fully and wholly protected by the boss 35 so that any rough metallic edges on the ear 28 are not normally contacted and other adjoining pan sets in the oven or elsewhere cannot hook or engage the ear 28 or the joint between the side strap 25 and the end strap 30.

Furthermore, the creation of the boss 35 protects and strengthens the corner of the strap and at the same time causes a closer adherence between the body of the strap 30 and the wall of the pan than would otherwise be possible.

It is also apparent that the lugs 34 provide a strong, rigid connection between the strap 30 and the pan wall and bead associated therewith.

What is claimed is:

1. In a baking pan set, the combination with a plurality of pans, of a strap coacting with the aligned end walls of said pans, a lateral ear formed at the end of said strap, an auxiliary strap coacting with the side wall of the end pan of the set and positioned under the ear aforesaid, means for securing said ear to said auxiliary strap, and means for protecting the joint between said ear and said auxiliary strap.

2. In a baking pan set, the combination with a plurality of pans, straps coacting with the exposed walls thereof, an ear on one of said straps overlapping the adjoining end of the other of said straps and secured thereto, and a boss formed on the other of said straps following the contour of the exposed edge of said ear.

3. In a baking pan set, the combination with a plurality of pans, straps coacting with the exposed walls thereof, an ear on one of said straps overlapping an end portion of said strap, an ear formed on a cooperating strap overlapping and secured to said ear on the first named strap, means for securing said straps in rigid assembly, and a raised boss formed on said first named strap adjoining the outer edges of the ear on the cooperating strap and following the contour thereof, the body of said first named strap adjoining said boss being sloped outwardly and merged with the boss aforesaid.

4. In the making of a baking pan set comprising a plurality of pans with outer beaded edges held together by a surrounding frame with a longitudinal marginal corrugation adjacent its upper edge, the step of flattening a portion of said corrugation to extrude said portion upwardly above the marginal edge of the frame to form a lug lying between the bead and wall of a pan.

5. A baking pan set, including: a plurality of pans, a frame surrounding said pans including a plurality of straps, an ear on the end of one of said straps bent back upon the strap, an ear on the end of an adjoining strap overlapping said bent back ear, and a rivet joining said ears.

6. A device as claimed in claim 5 in which the strap with the bent back ear is provided with a raised boss adjacent said ear.

7. A device as claimed in claim 5 in which the strap with the bent back ear is provided with a raised boss adjacent said ear, the top of said boss being substantially level with the outer surface of the second mentioned ear.

8. The combination with a plurality of baking pans arranged in spaced parallel relation and having flanges formed at the edges of the outer walls thereof, of a wire encircling each of said pans and engaged by the flanges of the associated pan whereby the sides and corners of the wire are completely covered, a frame encircling all of said pans including a plurality of straps, an ear on the end of one of said straps bent back upon the strap, an ear on the end of an adjoining strap overlapping said bent back ear, a rivet joining said ears, and means for protecting the joint between said straps.

9. A baking pan set, including: a plurality of pans with beads on their outer edges, a frame surrounding said pans, and a longitudinal marginal corrugation adjacent the upper edge of said frame, said corrugation having a flattened upwardly extruded portion adapted to lie between the bead and wall of a pan.

JOSEPH G. JACKSON.